Nov. 14, 1961  E. EISELE ET AL  3,008,458
INLET CHANNEL ARRANGEMENT IN THE
CYLINDER HEAD OF AN INTERNAL
COMBUSTION ENGINE

Filed July 30, 1958  2 Sheets-Sheet 1

INVENTORS
ERWIN EISELE
HELMUT SCHAFER
BY Dike and Craig
ATTORNEYS

Nov. 14, 1961     E. EISELE ET AL     3,008,458
INLET CHANNEL ARRANGEMENT IN THE
CYLINDER HEAD OF AN INTERNAL
COMBUSTION ENGINE
Filed July 30, 1958     2 Sheets-Sheet 2
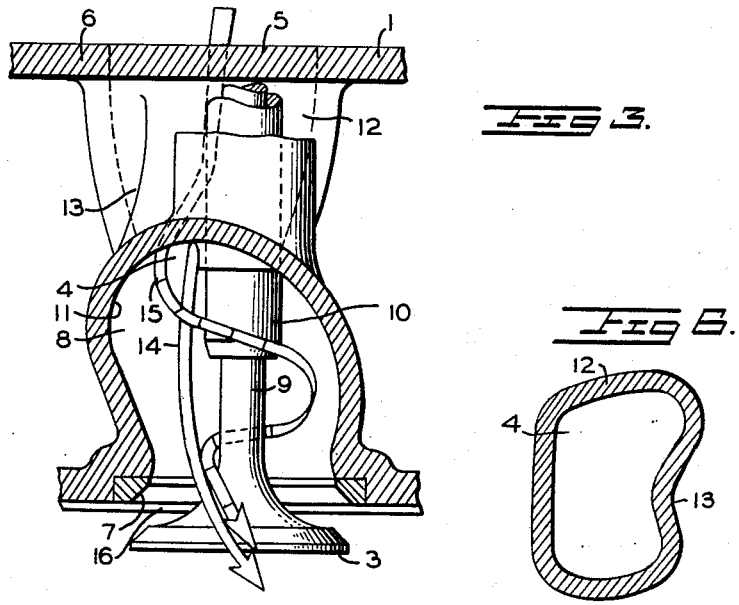
FIG 3.
FIG 6.
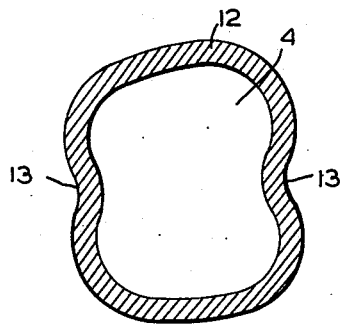
FIG 4.
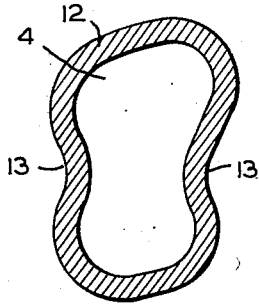
FIG 5.
INVENTOR,
ERWIN EISELE
HELMUT SCHAFER
BY Dicke and Craig
ATTORNEYS United States Patent Office 3,008,458
Patented Nov. 14, 1961

3,008,458
INLET CHANNEL ARRANGEMENT IN THE CYLINDER HEAD OF AN INTERNAL COMBUSTION ENGINE
Erwin Eisele, Stuttgart, and Helmut Schäfer, Kirchheim (Teck), Germany, assignors to Daimler-Benz Aktiengesellschaft, Stuttgart-Unterturkheim, Germany
Filed July 30, 1958, Ser. No. 752,091
Claims priority, application Germany Aug. 2, 1957
9 Claims. (Cl. 123—30)

The present invention relates to an inlet channel or passage for an inlet valve arranged in a suspended manner in the cylinder head of an injection-type internal combustion engine, especially of the air-compressing type, and aims primarily at an arrangement of the inlet channel which imparts to the inflowing combustion air a sufficiently large component in a circumferential direction of the cylinder so that, on the one hand, a good mixture is attained in connection with the injected fuel as well as also a sufficiently large component in the axial direction of the cylinder so that, on the other, a good filling is achieved.

Accordingly, the present invention consists in that the inlet channel is provided with means which subdivide the combustion air flowing into the cylinder through the inlet channel or passage into two flow-parts arranged one above the other, and to guide one of the flow-parts, preferably the lower one, essentially in the direction of the inlet channel through the valve gap whereas the other flow-part carries out in the valve chamber at first a helical rotary movement about the valve axis descending in the direction toward the valve seat and subsequently is carried along by the first-mentioned flow-part through the valve gap.

According to a further feature of the present invention, the inlet channel may be throttled or restricted laterally in the cross-sectional contour thereof at least in the part thereof adjacent the valve chamber. The throttling or restriction may be arranged only along one of the longitudinal sides of the inlet channel so that the cross-section of the inlet channel within the region of the throttling or restriction is constructed essentially in a reniform manner, however, the throttling or restriction according to another embodiment in accordance with the present invention may also be arranged at both longitudinal sides of the inlet channel so that the cross-section of the inlet channel within the region of the throttling area is constructed approximately in a lemniscate-manner or at least ovally.

For purposes of producing the rotary movement of the upper flow portion about the valve axis, the valve chamber may further be provided with a conical-helically shaped peripheral wall portion having an incline decreasing in the direction toward the valve seat. The termination or discharge of the part of the valve chamber provided with the conical-helically-shaped peripheral wall portions may advantageously correspond to or coincide essentially with the orifice of the channel part guiding the lower flow part in the inlet channel. Finally, the inlet channel may advantageously be inclined rather steeply from the upper part of the cylinder head, preferably under an angle of 40 degrees maximum with respect to the longitudinal axis of the cylinder.

Accordingly, it is an object of the present invention to provide an arrangement for the inlet passage of an internal combustion engine, particularly of the air-compression type having fuel injection, in which very favorable combustion processes are assured by the particular supply of combustion air.

Another object of the present invention resides in the provision of an inlet channel or passage for an overhead valve of an air-compressing injection-type internal combustion engine in which the combustion air is subdivided into two flow portions so as to achieve both a good filling and good mixture and to thereby improve the combustion processes in the engine.

A further object of the present invention is to provide a construction of an inlet channel for a suspended overhead valve of an air-compression fuel-injection internal combustion engine in which a portion of the combustion air is supplied to the combustion chamber with a sufficiently large axial component to provide good filling, whereas the other flow portion of the combustion air has a sufficiently large peripheral or circumferential component so as to assure good mixing of the combustion air with the injected fuel.

Still another object of the present invention resides in the provision of a construction of the inlet channel of an injection-type air-compressing internal combustion engine in which the spirally shaped flow portion of the combustion air is taken along by the flow portion having essentially a sufficiently large axial component.

These and other objects, features and advantages of the present invention will become more obvious from the following description when taken in connection with the accompanying drawing which shows, for purposes of illustration only, one embodiment in accordance with the present invention, and wherein:

FIGURE 3 is a cross-sectional view taken along line III—III of FIGURE 1;

FIGURE 4 is a cross-sectional view taken along line IV—IV of FIGURE 1;

FIGURE 5 is a cross-sectional view taken along line V—V of FIGURE 1; and

FIGURE 6 is a cross-sectional view of a further modification.

Figure 1:
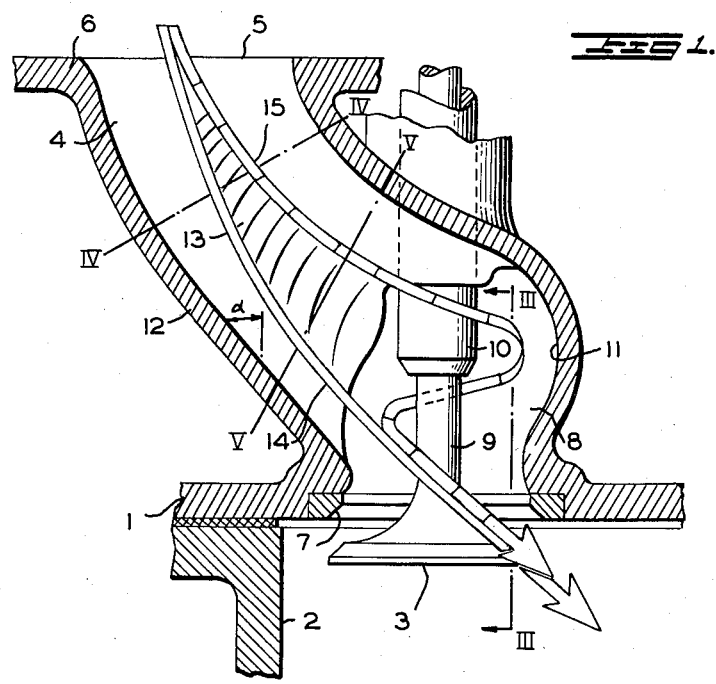
FIGURE 1 is a cross-sectional view through the cylinder head of an air-compression injection-type internal combustion engine essentially through the longitudinal axis of a suspended inlet valve and including an inlet channel in accordance with the present invention.
Figure 2:
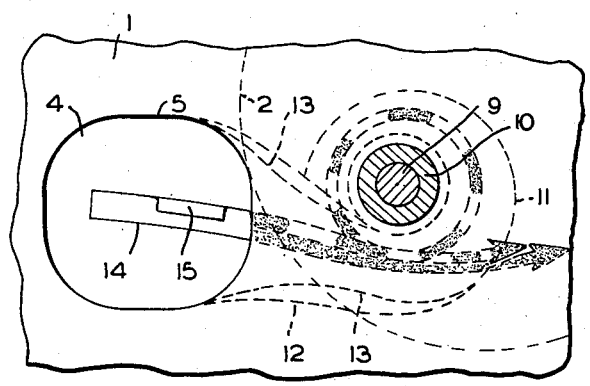
FIGURE 2 is a plan view of the cylinder head arrangement of FIGURE 1.

Referring now to the drawing, wherein like reference numerals are used throughout the various views to designate like parts, and more particularly to FIGURES 1 and 2, reference numeral 1 designates therein the cylinder head which is arranged on top of the cylinder 2 of an air-compression injection-type internal combustion engine. The cylinder head 1 is provided with an inlet valve 3 arranged parallel to the cylinder axis in a suspended manner, such as an overhead valve. The inlet channel 4 with the inlet cross-section 5 thereof at the top side 6 of the cylinder head 1 enters essentially under an angle α of about 40° with respect to the cylinder axis and forms above the valve seat 7 the valve chamber 8 through which extends the valve shaft 9 and partially also the valve guide means 10. The valve chamber 8 is provided with a conical-helically-shaped peripheral wall portion 11 having an incline which decreases toward the valve seat 7.

As may be seen particularly well from FIGURES 2, 4 and 5, the circumferential wall portions 12 of the inlet channel 4 are provided on both sides thereof with constrictions 13 to reduce thereat the cross-sectional area of inlet channel 4. These constrictions 13 extend approximately over the entire extent of the inlet channel 4 from the valve chamber 8 up to approximately the inlet cross-section 5 of the inlet channel 4. FIGURE 6 shows a modification of the circumferential wall portions 12 of the inlet channel 4 in which the constriction is arranged only along one longitudinal side of the channel.

Operation

The combustion air drawn in by the piston into the cylinder 2 of the internal combustion engine through the inlet channel 4 or, in the alternative, the combustion air supplied thereto by a blower is subdivided by the constricted portions 13 arranged laterally along the inlet channel 4 into two flow portions lying above one another, namely into the flow portion schematically indicated in the drawing by the full-line arrow 14 flowing through the lower part of the inlet channel 4 and into the upper flow portion indicated by the black and white arrow 15 flowing through the upper part of the inlet channel 4. The lower flow portion 14 is guided through the inlet channel 4 without any throttling in an essentially rectilinear direction tangential to the valve shaft 9 through the valve chamber 8 and through the valve gap 16 into the cylinder 2. The upper flow portion 15 arrives in the upper part of the valve chamber 8, and is forced thereat by the conical-helically-shaped peripheral walls 11 of the valve chamber 8 into a rotary movement of helical streamline about the valve shaft 9 which descends or falls in the direction toward the valve seat 7. Already prior to the exit of the flow portion 15 from the valve chamber 8 the flow portion 15 is seized after a rotation of about 360° about the valve axis by the lower flow portion 14 and is taken along by the latter through the valve gap 16. The flow portion 14 of the entire quantity of the inflowing combustion air supplies principally a component essentially in the axial direction of the cylinder for purposes of achieving a good filling, whereas the flow portion 15 produces principally a component essentially in the peripheral direction of the cylinder 2 for purposes of achieving a good mixture.

While we have shown and described one embodiment in accordance with the present invention, it is understood that the same is not limited thereto but is susceptible of many changes and modifications within the scope and spirit of the present invention, and we, therefore, do not wish to be limited to the specific embodiment illustrated herein but intend to cover all such changes and modifications within the scope and spirit of the present invention as are encompassed by the scope of the appended claims.

We claim:

1. An inlet channel construction for an inlet valve including a valve shaft and a valve disk suspendingly arranged in a cylinder head of an injection-type internal combustion engine, particularly of the air-compressing type, comprising an inlet channel and a valve chamber, means in said inlet channel extending over at least a part of the length thereof for subdividing the inflowing combustion air into two flow portions spaced from each other and arranged one above the other including first guide means for guiding the lower one of said flow portions rectilinearly above said valve disk so as to traverse said valve chamber essentially in the direction of the inlet channel and essentially to one side of said valve shaft and through the valve gap formed between said cylinder head and said inlet valve, and second guide means for guiding the other flow portion to one side of said valve shaft and to initially impart thereto in the valve chamber a rotary movement of helical streamline about the valve axis descending in the direction toward the valve seat and to enable said other flow portion to be subsequently taken along through said valve gap by said one flow portion.

2. An inlet channel construction according to claim 1, wherein said inlet channel is laterally constricted in the cross sectional area thereof at least in the part adjacent said valve chamber.

3. An inlet channel construction according to claim 2, wherein the constriction is arranged only along one longitudinal side of said inlet channel and the cross section of said inlet channel is constructed within the region of said constriction approximately in a reniform-like manner.

4. An inlet channel construction according to claim 2, wherein said constriction is arranged at both longitudinal sides of said inlet channel and the cross section of said inlet channel is constructed within the region of the constriction approximately lemniscate like.

5. An inlet channel construction according to claim 2, wherein the cross section of said inlet channel is oval within the area of said constriction.

6. An inlet channel construction according to claim 1, wherein said valve chamber is shaped in such a manner so as to form an essentially spiral coil-shaped flow passage for said other flow portion with the inclination of the spiral decreasing toward said valve seat for purposes of producing a rotary movement of the upper flow portion about the valve axis.

7. An inlet channel construction according to claim 6, wherein the discharge flow area of the portion of said valve chamber provided with said spiral coil-shaped flow passage coincides essentially with the discharge flow area of the channel portion guiding the lower flow portion in said inlet channel.

8. An inlet channel construction according to claim 7, wherein said inlet channel enters from the upper part of said cylinder head under an acute angle with respect to the cylinder longitudinal axis.

9. An inlet channel construction according to claim 8, wherein said inlet channel enters from the upper part of said cylinder head under an angle of 40° maximum with respect to the cylinder longitudinal axis.

References Cited in the file of this patent

UNITED STATES PATENTS

| | | |
|---|---|---|
| 1,662,106 | Dorner | Mar. 13, 1928 |
| 2,031,395 | Vincent | Feb. 18, 1936 |

FOREIGN PATENTS

| | | |
|---|---|---|
| 1,134,506 | France | Dec. 3, 1956 |